United States Patent Office 3,438,245
Patented Apr. 15, 1969

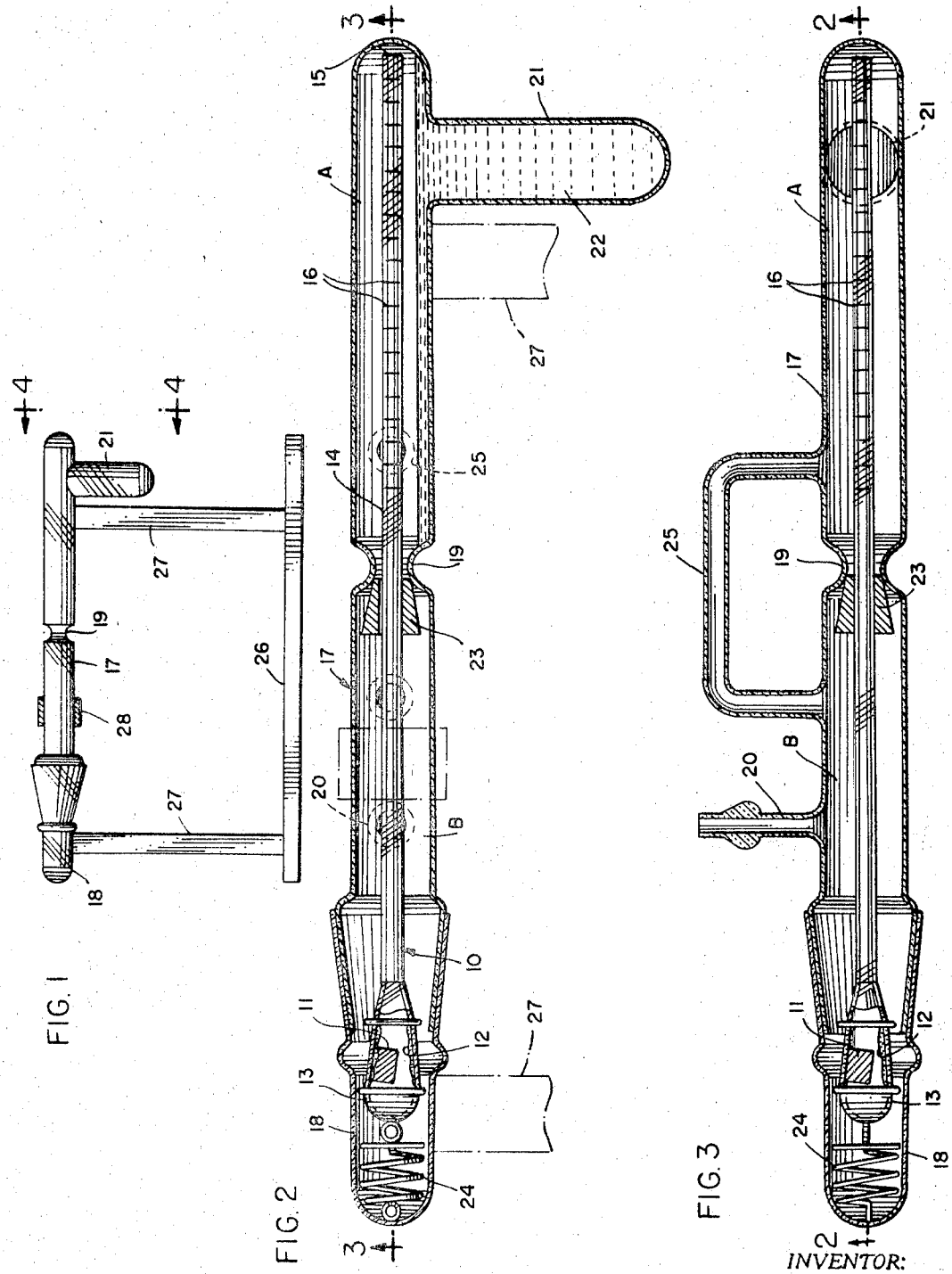

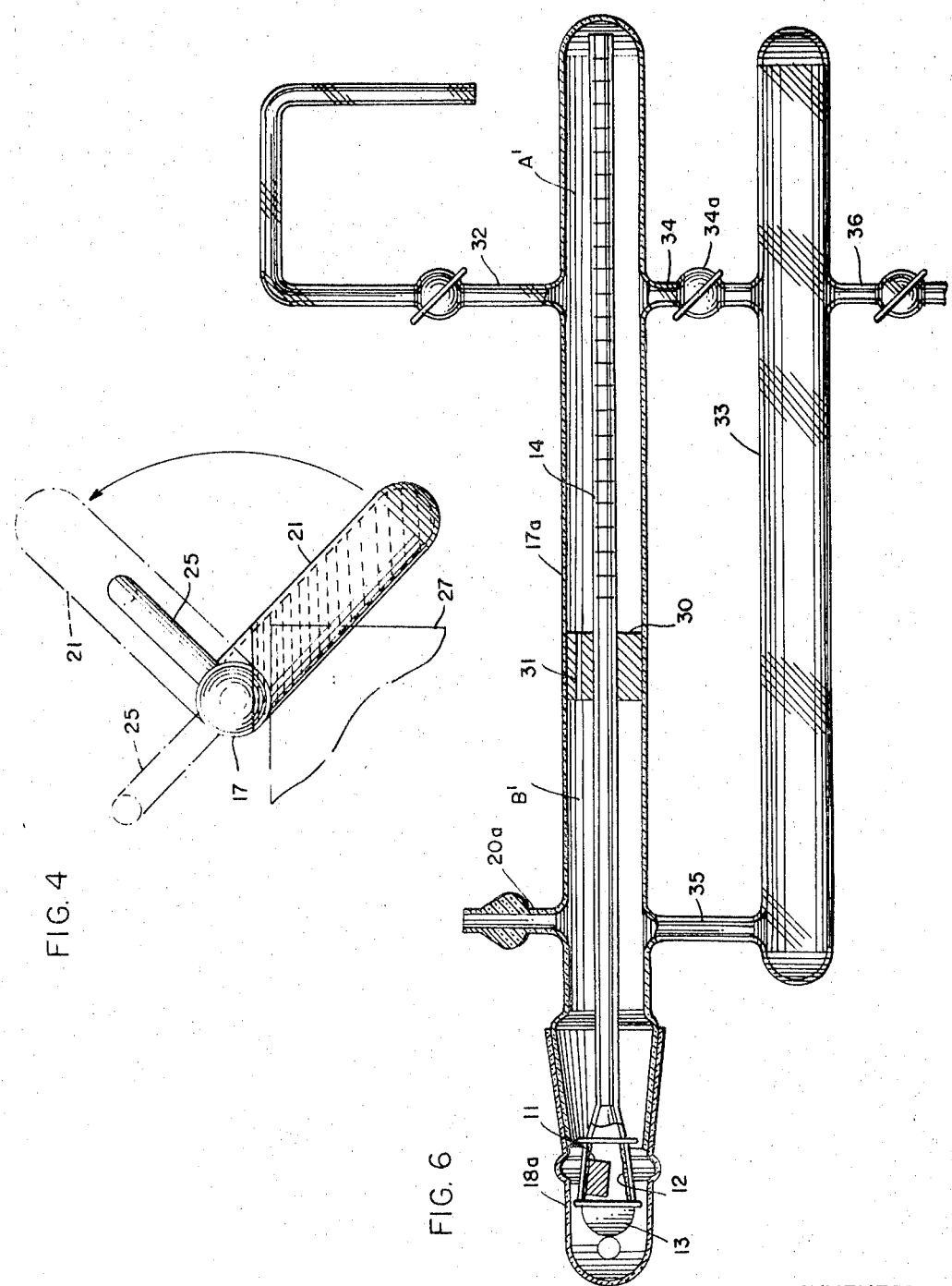

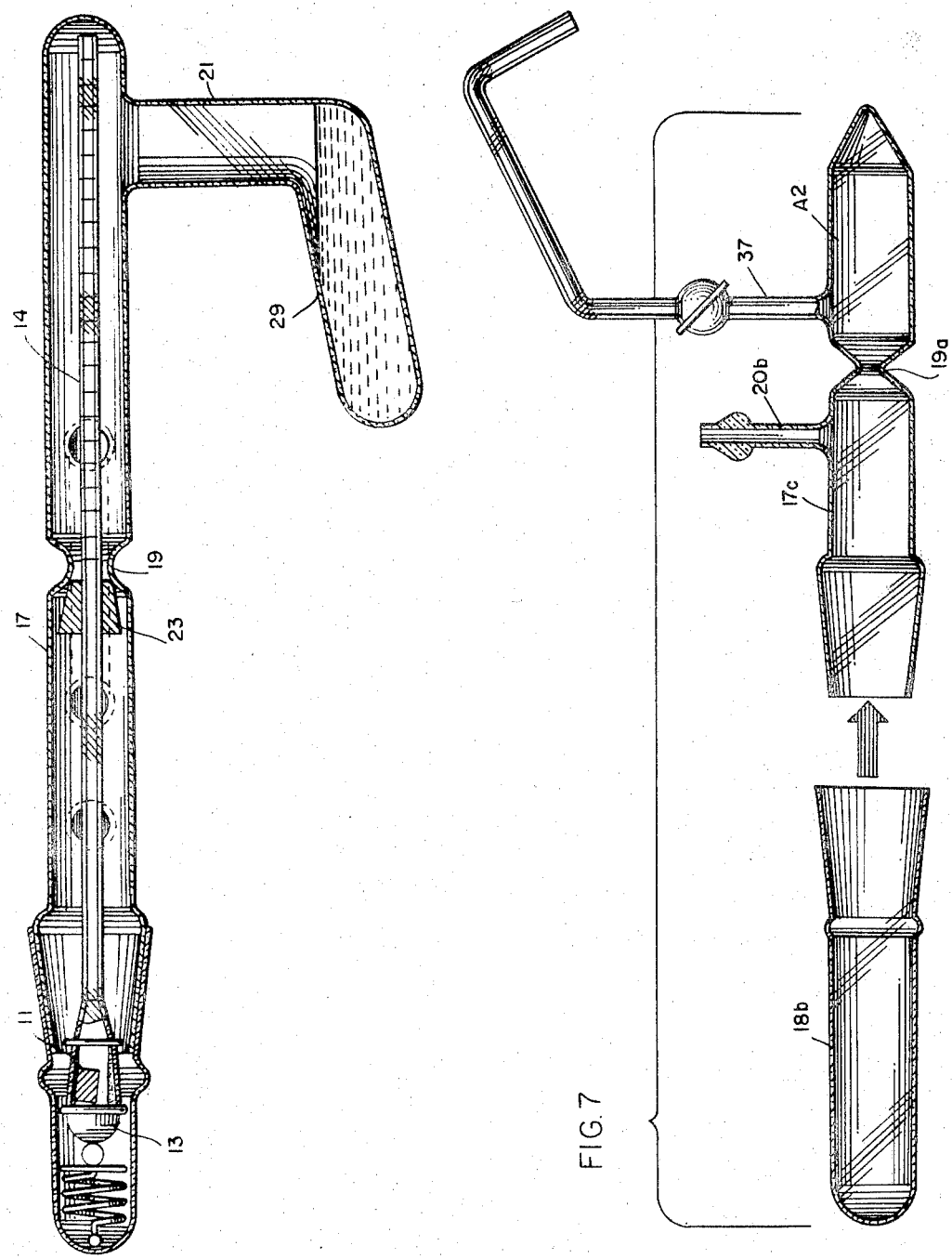

3,438,245
DEVICE FOR MEASUREMENT OF PORE SIZE AND POLUME
Nathaniel M. Winslow, Cleveland, Ohio, assignor to Prado Laboratories, Inc., Lakewood, Ohio, a corporation of Ohio
Filed Oct. 3, 1966, Ser. No. 583,838
Int. Cl. G01m *3/00*
U.S. Cl. 73—38                                    15 Claims

ABSTRACT OF THE DISCLOSURE

In a device for measurement of pore size and pore volume a large quantity of mercury is introduced into a reservoir through a constriction. A penetrometer containing a porous sample is inserted into a tubular member that is connected to the reservoir. A conduit is connected to the tubular member and air is withdrawn therefrom with a source of vacuum. The device is then rotated to bring the axis of the reservoir into a position for filling the penetrometer stem. After the penetrometer is filled the reservoir is rotated in reverse to its original position thus freeing the penetrometer from excess mercury. Desired increments of pressure are now added by introducing gas through the above mentioned conduit and through a flexible connection and valve means leading to a source of gas, the increments being measured and the movement of the mercury along the graduated portion of the stem being noted as in the usual practice of making determinations with the penetrometer.

---

This invention relates to a device for the measurement of pore size and pore volume, and is particularly useful in the measurement of size and volume of pores in porous materials such as oxides, sintered metals, carbon and graphite, fibrous materials, and the like. Such measurements are important because structural characteristics can control the performance of porous materials in practical application. Thus, in filtration, the ability of a filter medium to remove small particles from a suspension may be limited by the existence of pores of large size, and the volume of liquid passed by the filter at a set driving pressure depends on the volume of pores. Similarly, the reactivity of a catalyst or sorbent depends in part on the pore structure.

A number of methods for measuring pore size have been proposed, among them centrifugation, displacement of one liquid by another, gas permeability, transfer of a liquid from one porous medium to a standard medium, capillary condensation of non-reactive sorbates, and intrusion of non-wetting liquids. It is the last two of these, i.e., capillary condensation and intrusion, which have become generally accepted and commonly used for the measurement of pore structure. Because of physical or chemical properties required, nitrogen is usually used as the nonreactive sorbate for capillary condensation, and mercury as the nonwetting liquid for intrusion. Although this invention is described with specific reference to mercury intrusion, it will be understood that it is applicable for the use of any nonwetting liquid for the measurement of pore size.

In theory, either method can be used to measure pore sizes from the very smallest, which may be of molecular dimensions, up to the largest which exist in a porous material. However, there are practical limitations which define the range of usefulness of each method. Thus, capillary condensation becomes a very difficult technique for pores as large as about 0.2 micron diameter (2,000 angstroms) because of the very precise measurement of pressures and control of temperature which are necessary.

On the other hand, it is difficult to measure small pores by mercury intrusion because of the very high pressures required, the complexity of apparatus required to withstand the pressures, and the inaccuracies due to compressive and heating effects of high pressures. It has been calculated that upward of 300,000 p.s.i. would be required to measure by intrusion the smallest pores believed to exist in some materials such as catalysts and sorbents. The practical range for the intrusion method is upwards from about 0.03 micron 300 angstroms) pore diameter.

At the other extreme, the upper limit of the intrusion range is determined by the requirement that the apparatus used be capable of measuring low pressures. Further, the apparatus must be capable of manipulation so that the pressure can be increased in small, controlled increments. For example, a pressure of only 9 mm. Hg (0.18 p.s.i.) is required to force mercury into pores of 1,000 microns diameter. An increase of only 0.08 p.s.i. is required to penetrate pores down to 700 microns diameter. Thus, pressure increments smaller than 0.08 p.s.i. are significant in measuring pore diameters as large as several hundred microns.

Devices have been described which will measure pore diameters up to 50 microns with good accuracy, up to 100 microns with acceptable accuracy, and perhaps up to 200 microns if approximate results are sufficient.

It is an object of this invention to provide a device suitable for measuring pore diameters as great as 1,000 microns. Another object is to provide a device with which small controlled positive increments of pressure can be applied to the contained sample. It is a further object to provide a device in which a penetrometer, hereinafter to be described, can be manipulated without at any time reducing the pressure initially applied to fill it with mercury. Yet another object is to provide a device in which filling of the penetrometer can be completed without variation of pressure due to mercury head. Other objects and advantages will appear as the specification proceeds.

The measurement of pore size by intrusion with a nonwetting liquid depends on the principle that if a porous material is immersed in the liquid, the liqud does not fill the pores because it is repelled by the forces at the nonwetting interface. Pressure is required to cause the liquid to penetrate or intrude the voids, and the amount of pressure required is greater, as the size of the pores is smaller. With the assumption of cylindrical pore shape, and providing air and other gases have been removed from the pores to avoid back pressure developed as the intrusion proceeds, the relation between pore diameter and pressure required to effect intrusion is expressed by the following equation:

$$D = 4\sigma \cos \psi / P$$

wherein $\sigma$ is the surface tension of the liquid, $\psi$ is the wetting angle of the liquid and solid, P is the applied pressure, and D is the diameter of the smallest pore filled. For the mercury system, by substitution of suitable values for the constants, the equation reduces to the following expression:

$$D_M = 175/P_{p.s.i.}$$

wherein D is the pore diameter in microns and P is the applied pressure in pounds per square inch (p.s.i.). Using this equation, the procedure for a determination of pore size and volume by mercury intrusion must consist of the following steps: First, air and the other gases must be removed from the pores of the sample. Then the sample is immersed in mercury. Thereafter increments of pressure are applied while the volume of mercury which penetrates the sample after each increase of pressure is measured. If, for example, the initial pressure applied were 0.18 p.s.i., all pores greater than 1,000 microns diameter would be penetrated by mercury at the time of filling. If the pressure then were raised to 0.26 p.s.i., mercury would penetrate pores down to 700 microns diameter if pores in this size interval existed in the material being tested. The volume of mercury penetrating the sample would represent the volume of pores between 1,000 and 700 microns diameter. An additional increment of pressure would result in penetration of pores smaller than 700 microns diameter, etc., the final result being a series of volumes of pores in known size intervals downwards from 1,000 microns diameter.

The invention is shown, in illustrative embodiments, by the accompanying drawings, in which—

FIG. 1 is a side view in elevation of a filling device embodying my invention; FIG. 2, a longitudinal sectional view on an enlarged scale of the filling device shown in FIG. 1, the section being taken as indicated at line 2—2 of FIG. 3; FIG. 3, a longitudinal sectional view, the section being taken as indicated at line 3—3 of FIG. 2; FIG. 4, a broken end view of the structure shown in FIG. 1 illustrating the rocking movement of the device in the use of my invention; FIG. 5, a view similar to FIG. 2 but showing a modification of the structure; FIG. 6, a vertical sectional view of apparatus showing a second modification of the filling device; and FIG. 7, a vertical sectional view of a third modification of my invention.

In the embodiment of my invention illustrated in FIGS. 1–4, inclusive, I employ a penetrometer 10 containing a sample 11 of porous material which is to be tested. A penetrometer is a known instrument for determining pore spectra by intrusion and was first disclosed in Shapiro and Winslow U.S. Patent 2,886,964. It consists of a bell-shaped member 12 for receiving the sample to be tested and is equipped with a suitable closure 13. The stem member 14 of the penetrometer is open at its outer tip 15 and preferably is provided near its outer portion with a series of graduations or calibrations 16. The internal volume of the stem from the open tip, together with the volume of the sample bulb, forms a continuous space within the penetrometer.

The use of a penetrometer for determining pore spectra by intrusion requires the following manipulations: First, the sample must be introduced into the sample bulb and the closure applied. Second, gas must be evacuated from the volume within the penetrometer, including the pore volume of the sample. Third, without admission of gas, the open tip of the penetrometer stem must be immersed in a pool or reservoir of mercury to a depth such that there is enough mercury above the stem tip to fill the penetrometer. Next, sufficient pressure must be applied to the surface of the mercury pool to cause mercury to fill the penetrometer surrounding the contained sample. Then, the tip of the penetrometer must be freed from the mercury pool. Finally, means must be provided to increase the pressure applied to the penetrometer in a stepwise manner, as hereinbefore described, and further means to determine any change in level of mercury in the penetrometer stem resulting from penetration into the sample as the pressure is increased. As is well known to the art, the required increase in pressure can be effected simply by admitting controlled amounts of air from the atmosphere, if the pores being measured are coarse, larger than about 10 microns diameter, as with the device of this invention. At superatmospheric pressures, as when the penetrometer has been transferred to a porosimeter for the measurement of smaller pores, the pressure can be increased by introducing gas or hydraulic fluid by means of a pump or from a high pressure reservoir. Change in mercury level in the penetrometer stem can be determined by visual observation if the penetrometer is being pressured in a transparent chamber, as in the device of this invention. For this purpose, the stem of the penetrometer is calibrated with respect to volume and marked with suitable graduations. The difference between two successive readings then represents the volume of the pores in a size interval corresponding to the pressure levels applied. If desired, the penetrometer stem can be used in conjunction with a resistance or capacitance circuit for measurement of change in the mercury level. For this purpose, the stem is constructed with uniform internal diameter, and the intruded volume is proportional to the change in level determined electrically.

There are several disadvantages inherent in the designs of filling devices heretofore used for the manipulation of penetrometers. These disadvantages are overcome by the filling devices shown herein in which filling can be accomplished with the penetrometer in a horizontal position, or, if desired, at a very small, tipped-down angle. In the former case, the tip of the penetrometer can be freed from the mercury pool without deviating from the horizontal position. In the latter, the motion required to free the tip is small, and the resulting change in mercury head can be as little as 0.23 p.s.i. permitting practical measurements up to at least 300 microns pore diameter. Further, even this small variation in head is positive, i.e., an increase in the pressure applied to the sample, hence there is no possibility of desorption of mercury. After filling, and removal of the penetrometer tip from the mercury pool, the penetrometer remains in the horizontal position as small increments of pressure are applied during the measurement of coarse porosity. If mercury penetrates the sample, the mercury level in the penetrometer stem moves along a horizontal line. Hence there is no change in pressure resulting from the intrusion, and no separate measurement or compensation is required as with other filling devices.

The geometry of the device of this invention is such that an amount of mercury sufficient to fill the penetrometer is equivalent to only 3 or 4 millimeters of head within the device. Hence the need for careful estimation of the quantity required is not necessary as, for example, 25 percent excess would cause an error of only about 1 mm. or 0.02 p.s.i. A variation of this magnitude is tolerable even in the measurement of very large pores of 1,000 microns diameter or greater. One of the modifications of this invention allows the operator to introduce a large quantity of mercury into the device, enough for several determinations, yet maintain the tolerance of pressure change necessary for measurement of large pores. If desired, the penetrometer can be transferred from the device of this invention into high pressure equipment while maintaining the horizontal position. However, if it is desired to turn the penetrometer to the vertical, tip-up position, the manipulation can be done with a pressure change not more than half as great as with conventional filling devices. Further, one modification of this invention permits the operator to effect the righting of the penetrometer in a stepwise manner.

In the filling device modification shown in FIGS. 1–4, inclusive, I provide a tubular body 17 with a closure 18 receiving the bell-shaped chamber of the penetrometer 10 and with the outlet end 15 of the stem just short of the closed opposite end of the tubular body member. Between the ends of the tubular member 17, I provide a constriction 19 receiving the stem portion of the penetrometer 10. The constriction 19 divides the tubular body 17 into two chambers, a liquid-receiving chamber A and a chamber B closed by said closure 18. Communicating with chamber B is an inlet tube 20 which is alternatively connected by the use of valve means to a source of vacuum and to a source of gas.

As a means for supplying mercury to the chamber A, I provide a reservoir tube 21 containing mercury or other suitable material 22. In order to prevent the flow of mercury through the constriction from the chamber A to chamber B, I provide a sealing plug 23 which fits against the constriction, as shown best in FIGS. 2 and 3. With this modification, I prefer to employ a spring member 24 or other resilient means for urging the plug 23 against the constriction. Thus, as the penetrometer is inserted within the tubular body 17, and as the stem 14 moves forwardly through the constriction, the plug carried by the stem presses against the constriction and is held in this position when the closure 18 is secured, as shown best in FIG. 2. The engagement of the plug with the penetrometer stem need not be firm but can be sliding, and contact of the plug with the constriction can be relatively light. Mercury will not flow through openings of small magnitude at the low pressures applied. However, the spring means 24 is useful in holding the penetrometer in place in the event of chance vibrations of the device in use.

A vent to equalize pressure between chambers A and B of the tubular device 17 is provided by the U-shaped vent tube 25. This provides an unvalved conduit between the chambers and in the arrangement shown mercury will not flow from chamber A to chamber B.

The reservoir 21, beyond the requirement that its axis be substantially perpendicular to the plane of vent tube 25 and conduit 20, may be of any shape and size convenient and consistent with the flow of mercury from the reservoir into the chamber A, and vice versa, to immerse the stem of the penetrometer, and subsequently, after filling the penetrometer, to free the tip from excess mercury. Conveniently, as shown, it is tubular in shape, intimately formed with the body member 17 and with volume approximately one-third that of chamber A.

In the use of the structure shown in FIGS. 1–4, inclusive, I prefer to mount the tubular member 17 upon a support frame 26 providing vertical blocks 27 on which the tubular member 17 may rest in a horizontal plane. To secure the tubular member 17 in a fixed position, a clamp 28 or other suitable means may be used. By this means, upon release of the clamp, the tubular member may be rotated while the axis of the penetrometer stem 14 is held in a horizontal position.

In the operation of the device, it is necessary to fill the reservoir 21, and this may be accomplished by introducing a large quantity of mercury through the open end of the tubular member 17 and through the constriction 19 to fill the reservoir 21, preferably to the extent shown in FIG. 2 and with the parts supported as illustrated in FIGS. 1 and 2. With the structure supported as shown in FIGS. 1 and 2, the penetrometer containing the porous sample is inserted in the position shown in FIG. 2 and the closure 18 placed in position to seal the tubular member 17. Air is withdrawn through conduit 20 by means of a flexible connection (not shown) communicating with a source of vacuum. Then the device is rotated, as illustrated in FIG. 4, to bring the axis of the reservoir into a position for filling chamber A to a level above the inlet 15 of the stem. Vent 25 and conduit 20 move toward the upwardly-pointing vertical position shown in FIG. 4 as mercury flows from the reservoir 21 into chamber A immersing the tip of the penetrometer stem and then may be moved beyond and away from the vertical. After filling of the penetrometer, the tubular member is rotated in a reverse direction, causing mercury to flow from chamber A into the reservoir tube 21, thus freeing the tip of the penetrometer from the excess mercury. It is not necessary to remove all the mercury from chamber A, but merely sufficient to free the tip of the penetrometer.

When the tip of the penetrometer has been freed from the excess mercury, desired increments of pressure are added by introducing gas through conduit 20 and through a flexible connection and valve means (not shown) leading to a source of gas, the increments being measured and the movement of the mercury along the graduated portion of the stem being noted as in the usual practice of making determinations with the penetrometer.

The device of FIGS. 1–4 has many advantages. The tip of the penetrometer can be freed from the excess mercury without changing the pressure applied to the sample. During intrusion, the mercury meniscus within the penetrometer stem moves along a horizontal line and no change in pressure results from the movement. If a relatively large excess of mercury is present in the body member, the resulting variation in applied pressure is small. If it is desired at any time during a determination to move the penetrometer to the vertical, tip-up position, the resulting change in pressure approaches not more than the head of pressure in the penetrometer, whereas with conventional devices, filled in the vertical, tip-down position, the resulting change in pressure approaches twice the head of mercury in the penetrometer after it has been moved to the vertical, tip-up position.

The device of this invention can be brought to the vertical, tip-up position from the horizontal in step-wise manner. Manipulation in this way allows the total pressure change resulting from the head of mercury in the penetrometer to be applied as a series of increments. Intrusion of mercury effected by each successive increment can be observed. Thus, the interval of pore size between the smallest diameter penetrated with the device horizontal and the smallest penetrated at the highest pressure of the vertical position is divided into a series of small intervals for the more accurate determination of the pore diameters.

In FIG. 5, there is shown a modification of the structure shown in FIGS. 1–4, inclusive. The modification consists of adding an angular extension 29 to the reservoir 21. In all other respects the structure is the same as shown in FIGS. 1–4. Manipulation of the device of FIG. 5 for the determination of an intrusion spectrum is the same as heretofore disclosed with reference to FIGS. 1–4, mercury being caused to flow into and out of the tubular member 17 by rotating the device about the axis of the penetrometer in a bearing member (not shown). The bearing device may be supported on a pivot or swivel about which the device can be rotated around a line vertical to the axis of the penetrometer, i.e., counterclockwise. At any time during a determination, for example, when the pressure within the device has been raised from the starting pressure to atmospheric pressure, the righting of the penetrometer can be carried out in a stepwise manner, conveniently on a series of stops, intrusion being read after each step.

Before bringing the penetrometer to the vertical, tip-up position, the total amount of excess mercury in the device is drained from body member 17 into reservoir 21 and extension 29. The volume of extension 29 should be sufficient to receive all the mercury from the reservoir 21. The location of extension 29 is below reservoir 21 when the vertical position is reached, i.e., between reservoir 21 and constriction 19. Otherwise, it will be understood, the shape, position and volume of reservoir 29 are not critical. Conveniently, as shown is FIG. 5, reservoir 29 is tubular, its axis lies in the plane of the axes of the penetrometer and reservoir 21, and the angle formed by the axes of reservoir 21 and extension 29 is not a right triangle.

Manipulation of the device by rotation around the axis of the penetrometer has been described as being the same as that shown in FIGS. 1–4, inclusive. However, manipulation can also be accomplished by revolving the axis of the penetrometer around a spaced line which is parallel to it. For example, the body member 17 may be engaged by a clamp carried by an arm having its inner end rotatably mounted so that as the arm is rotated in its bearing, the axis of the penetrometer revolves around the axis of the bearing. The arm and reservoir 21 move in parallel planes as the device is thus rotated. With the axis of reservoir 21 located inwardly from body member 17, the axis of reservoir 21 is a radius of the revolution, and through 180° of rotation mercury will flow from the body member into the reservoir 21, and vice versa.

For example, using the position shown in FIG. 4 and with the device shown in FIG. 2, the mercury will be largely or wholly in the reservoir 21, depending upon the quantity of mercury in the device. If the supporting arm is moved through an arc of 90° reservoir 21 will reach the horizontal position and mercury will flow from the reservoir 21 into the body 17, immersing the penetrometer tip. If the quantity of mercury is not sufficient to immerse the tip at this point, the arm is rotated farther than 90°, causing more of the mercury to flow into chamber A of body member 17. After filling the penetrometer, when it is desired to free the penetrometer tip from the excess mercury, the device need be brought back far enough to free the top of the penetrometer and to bring the level of mercury within body member 17 below the lip of the constriction 19.

In FIG. 6 is shown another modification of the invention in which the filling device can be adapted for use in the horizontal position without the necessity for rotary, tilting or revolving motion. In this structure, the tubular member 17a, preferably formed as a tubular member of glass or other suitable transparent material, has one end closed and the other equipped with a closure 18a. At an intermediate point is provided a constriction plug 30 provided near its top with a vent passage 31. The constrictive plug 30 is centrally apertured to receive the stem 14 of a penetrometer and to support the same as it lies within the device in the manner described in connection with FIGS. 1–4. An outlet 20 or 20a connects with a vacuum system to provide a path for the removal of air at the start of a determination and with a source of gas for readmission of gas when small pressure increments are subsequently applied within the device. Through a valve conduit 32, mercury can be admitted to the device.

The constriction is provided by the shaped constrictive plug 30 placed within the body member 17a and may be formed of rubber, plastic, or other suitable material. The constrictive member 30 provides a mercury-receiving chamber $A^1$ and a chamber $B^1$ closed by the closure 18a.

The chamber $A^1$ of the tubular member 17a is provided with a member 33, conveniently an elongated tubular member or other shape, communicating with the chamber $A^1$ through valved conduit 34 which permits mercury to be drained from chamber $A^1$. To permit drainage of the mercury, equal pressure must be maintained in the chambers $B^1$ and $A^1$, and for this purpose a vent 31 is provided, and a vent tubular connection 35 extends between tubular member 33 and chamber $B^1$ of the tubular member 17a. The mercury can be withdrawn from the tubular member 33 through the valved conduit 36.

In using the device of FIG. 6, with the penetrometer and sample placed therein, air first is evacuated through conduit 20a, with conduits 32, 34 and 36 closed by their respective valves. Mercury is admitted through conduit 32 until the level within chamber $A^1$ is between the horizontal top of the penetrometer stem 14 and the orifice 31. Desirably, the level of the mercury is about one millimeter above the stem, thus providing sufficient excess to fill the penetrometer.

After admission of mercury into the body member to the desired level, an increment of pressure is applied to the mercury surface to fill the penetrometer and to penetrate the porosity of the sample down to any desired pore diameter. With the penetrometer in the horizontal position as shown, the mercury head which must be overcome in order to effect filling is equal to the maximum radius of the flared member of the penetrometer. In penetrometers commonly used in the art, this radius is 7.5 mm. Hence the first increment of pressure applied must be at least equal to a head of 7.5 mm., or 0.14 p.s.i.

The pressure applied at the midpoint of the sample will depend on the shape and size of the sample, and on its orientation when floated in the mercury against the top of the sample bulb. It is desirable to prepare the sample as a cylinder or rectangular prism with one dimension materially shorter than any other. By so doing, the sample will be floated flat against the top of the sample bulb, and the midpoint will be at a minimum distance from the top. Often, as with carbons, sintered metals, paper, fabric, catalyst supports in nodular or granular form, a sample can be chosen such that the minimum dimension is not more than 4 mm. For example, a sample might be a cylinder 4 mm. in diameter, floated against the top of the sample bulb, with its axis, chosen to be longer than 4 mm., substantially parallel to the wall of the bulb. The midpoint of the sample after filling of the penetrometer then would be only very slightly more than 2 mm. below the top of the bulb. The pressure at the midpoint when the minimum pressure required for filling has been applied would be 2 mm. or .04 p.s.i. This pressure would effect intrusion of porosity only down to 4375 microns.

It has proved to be a practical technique, almost always adequate to measure the coarsest porosity which is of technological importance, to start the intrusion measurement with the device of FIG. 6, as well as the other devices shown, at 1500 microns diameter. For this procedure, the initial increment of pressure would be 11.5 mm. or 0.22 p.s.i., and the pressure applied at the midpoint of the sample would be 6 mm., or 0.12 p.s.i. At this pressure, it will be understood, pores of 1500 microns diameter which are located in the bottom portion of the sample as it floats in the mercury will be filled, and to include the volume of these pores in the measurement would require starting at a still lower pressure.

After filling the penetrometer, excess mercury is drained from the body member through valve 34a into chamber 33. It is not necessary to remove all the mercury from the body member, only sufficient to first free the tip of the penetrometer, then to bring the level of the mercury below the constriction 30 to permit subsequent withdrawal of the penetrometer.

When the tip of the penetrometer has been freed from the excess mercury, desired increments of pressure are added. As and if intrusion occurs into pores smaller than 1500 microns diameter, the intruded volume is shown by movement of mercury within the penetrometer stem. This movement is along a horizontal line, and it does not result in any change of pressure within the penetrometer bulb. At any time the penetrometer may be removed from the device and turned to the tip-up position, the uncontrolled change in pressure cannot be more than the pressure exerted by the mercury remaining in the penetrometer stem after occurrence of intrusion, regardless of whether the intrusion occurs in the horizontal position or during or after the righting operation.

In FIG. 7 is shown a filling device in its simplest form. The tubular body member 17b has an open end and a closed end, the closed end being provided with a closure 18b. The tubular member formed of glass or other suitable transparent material is formed with a constriction 19b which supportedly engages the stem of a penetrometer of the type shown in FIGS. 1–4, inclusive. Thus, in use in the horizontal position, a suitable penetrometer would rest within the filling device, with its flared member against the body member near the closure and with its stem resting on the inner circumference of the constriction 19a. The distance between the constriction and the closed end of the body member would be enough to expose the calibrated length of the penetrometer stem to view through the transparent wall of the body member. The body member may be supported as described in connection with FIGS. 1–4.

For carrying out an intrusion determination, the penetrometer is first introduced into the filling device and the closure applied. Next, the position of the device is adjusted conveniently against one of two or more stops (not shown) so that the penetrometer is held in a horizontal position. Air is then pumped out of the device through the outlet 20b which, as heretofore described, may be connected through flexible valved conduits (not shown) alternately to a source of vacuum or gas. Mercury is admitted through the valved conduit 37 in sufficient amount to fill the volume defined by the constriction 19b and the closed end of the filling device substantially to the lip of the constriction but not to flow through the constriction and around the penetrometer stem. For example, mercury is admitted until its level within chamber A² is approximately one millimeter below the lip of the constriction 19b. When the evacuation of air has been completed, the device is rotated clockwise so as to lower the tip slightly below the surface of the mercury. If the swivel is at the midpoint of the penetrometer, the sample within the penetrometer bulb is raised by an equal amount.

After immersion of the tip of the penetrometer stem, additional mercury is added through conduit 37 to fill the penetrometer. It is an advantage of the device that relatively large excesses of mercury can be added without introducing serious error.

After the tip of the penetrometer has been immersed and the mercury necessary for filling has been admitted, pressure is applied through the conduit 20b, the first increment of pressure being at least enough to cause the penetrometer to fill. The device is then rotated to the horizontal position counterclockwise, thus eliminating the negative head of mercury. Pressure is then applied to the sample in increments as heretofore described, the intrusion being measured by the recession of mercury in the penetrometer stem. The recession of mercury in the calibrated stem of the penetrometer can be observed and the calculation of porosity made, as heretofore described.

While in the foregoing specification I have set out specific embodiments of the invention in considerable detail for the purpose of illustrating the invention, it will be understood that such details may be varied widely by those skilled in the art without departing from the spirit of my invention.

I claim:

1. In combination with a penetrometer having a closure-equipped chamber for receiving a sample of porous material and a hollow stem communicating with the chamber, a tubular body having a closed end and having also an open end adapted to receive said penetrometer, a closure for said open end, said body having also a constriction between the ends thereof forming a liquid-receiving chamber and a chamber closed by said closure, said constriction receiving and supporting an intermediate portion of said stem with the open end thereof in said liquid-receiving chamber, means at said constriction preventing flow of liquid from said liquid-receiving chamber to said closed chamber through said constriction, means for connecting said tubular body alternately with vacuum and gas sources, means for supplying liquid to said liquid-receiving chamber for filling said penetrometer through said stem, means for withdrawing liquid away from the open end of said stem, and venting means preventing liquid flow between the chambers but equalizing pressures between the chambers.

2. The structure of claim 1 in which said tubular body is supported for rotation with the longitudinal axis thereof in a horizontal plane.

3. The structure of claim 1 in which means for supplying liquid to said liquid-receiving chamber comprises an angularly extending reservoir arm communicating with said chamber.

4. The structure of claim 3 in which the tubular body is supported on its longitudinal axis for rotation to feed liquid from said reservoir arm to said liquid-receiving chamber.

5. The structure of claim 1 in which said stem of the penetrometer is provided with a plug for sealing said constriction.

6. The srtucture of claim 1 in which said constriction is provided by a shaped constriction plug received by said tubular body.

7. The structure of claim 6 in which the vent means consists of a channel extending through said plug.

8. The structure of claim 1 in which the vent means consists of a bypass tube connecting said chambers.

9. The structure of claim 2 in which said angularly extending reservoir arm is provided with an angular extension providing a receptacle for liquid when said penetrometer is brought to a generally vertical position.

10. The structure of claim 1 in which said penetrometer stem is calibrated and said tubular body is transparent for rendering said calibrations visible.

11. In combination with a penetrometer having a closure-equipped chamber for receiving a sample of porous material and a hollow stem communicating with the chamber, a tubular member having a closed end and having also an open end adapted to receive said penetrometer, a closure for said open end, said body having also a constriction between the ends thereof forming a liquid-receiving chamber and a chamber closed by said closure, said constriction being formed in said tubular body, means for connecting said second-mentioned chamber alternately with vacuum and gas sources, means for supplying liquid to said liquid-receiving chamber for filling said penetrometer through said stem, means for withdrawing liquid away from the open end of said stem, a sealing plug carried by said stem and engageable with said constriction for sealing the same, venting means preventing liquid flow between the chambers but equalizing pressures therein, and resilient means urging said plug carried by said penetrometer against said constriction to seal the same.

12. The structure of claim 11 in which said liquid-filling means comprises an angularly extending reservoir arm communicating with said liquid-receiving chamber.

13. In a filling device for a penetrometer having a closure-equipped chamber for receiving a sample of porous materal and having a hollow stem communicating with said chamber, a tubular transparent body member having one end closed and the opposite end open adapted to receive said penetrometer with the open end of the stem thereof adjacent said closed end, a closure for the open end of said tubular body, means for establishing communication between said tubular body and a source of vacuum and a source of gas, and means for supplying a filling liquid to an end portion of said tubular body adjacent the open end of said penetrometer stem, said tubular body having a constriction supporting an intermediate portion of said stem and extending between said removable closure and said liquid-supplying means, means at said constriction preventing flow of liquid from said liquid-receiving chamber to said closed chamber through said constriction.

14. The structure of claim 13 in which the constriction of said tubular body comprises a shaped body forming a seal within the tubular body and centrally apertured to receive the stem of said penetrometer, said shaped body being provided with a vent orifice extending through the upper portion of said shaped body whereby when said tubular body is partially filled with liquid above the open end of said stem for filling the same, said vent orifice provides open communication between the portions of said tubular body on either side thereof.

15. The structure of claim 13 in which a second tubular body is provided below said first-mentioned tubular body and communicating conduits extend between it and said first-mentioned tubular body on either side of said shaped body, said second-mentioned tubular body being provided with a valve-controlled drain tube.

References Cited

UNITED STATES PATENTS 2,886,964   5/1959   Shapiro et al. _____ 73—38
3,073,357   1/1963   Hampton _____ 73—38

LOUIS R. PRINCE, *Primary Examiner.*

WM. HENRY, *Assistant Examiner.*